United States Patent
Maglica

(10) Patent No.: US 9,444,081 B1
(45) Date of Patent: Sep. 13, 2016

(54) METHOD AND APPARATUS FOR MINIMIZING BATTERY CORROSIVE ELECTROLYTE LEAKAGE

(71) Applicant: Mag Instrument, Inc., Ontario (CA)

(72) Inventor: Anthony Maglica, Ontario (CA)

(73) Assignee: MAG INSTRUMENT, INC., Ontario, CA (US)

(*) Notice: Subject to any disclaimer, the term of this patent is extended or adjusted under 35 U.S.C. 154(b) by 0 days.

(21) Appl. No.: 15/171,392

(22) Filed: Jun. 2, 2016

Related U.S. Application Data

(63) Continuation of application No. 14/869,628, filed on Sep. 29, 2015, now Pat. No. 9,368,767, and a continuation of application No. 14/869,962, filed on Sep. 29, 2015, now Pat. No. 9,368,768.

(51) Int. Cl.
*H01M 2/10* (2006.01)
*H01M 10/28* (2006.01)
*H01M 2/14* (2006.01)

(52) U.S. Cl.
CPC ............ *H01M 2/1055* (2013.01); *H01M 2/14* (2013.01); *H01M 10/287* (2013.01); *H01M 2220/30* (2013.01)

(58) Field of Classification Search
CPC ......... F21L 15/06; F21L 15/04; F21L 4/005; H01M 2/14; H01M 10/287; H01M 2220/30

USPC .......................................... 320/109–112, 107
See application file for complete search history.

(56) References Cited

U.S. PATENT DOCUMENTS

| | | | | |
|---|---|---|---|---|
| 2,252,088 A | * | 8/1941 | Meyerhoefer | B62J 6/02 362/157 |
| 2,260,639 A | * | 10/1941 | Powell | F21L 15/06 340/321 |
| 5,645,955 A | | 7/1997 | Maglica | |
| 5,795,675 A | | 8/1998 | Maglica | |
| 9,368,768 B1 | * | 6/2016 | Maglica | H01M 2/1055 |
| 2012/0326665 A1 | * | 12/2012 | Yin | B60L 11/1801 320/109 |
| 2013/0049582 A1 | * | 2/2013 | West | H05B 33/0824 315/33 |
| 2015/0103517 A1 | * | 4/2015 | Maglica | F21V 23/0414 362/183 |

* cited by examiner

*Primary Examiner* — Anabel Ton
(74) *Attorney, Agent, or Firm* — Roy L Anderson

(57) ABSTRACT

Battery corrosive electrolyte leak is reduced by using spacers (which can be made of a shock absorbing material) between each pair of batteries held in the series configuration so that a resilient contact provides an electrical contact between the pair of batteries and the thickness of the spacer prevents a second end of a first battery from contacting the first end of the second battery.

4 Claims, 20 Drawing Sheets

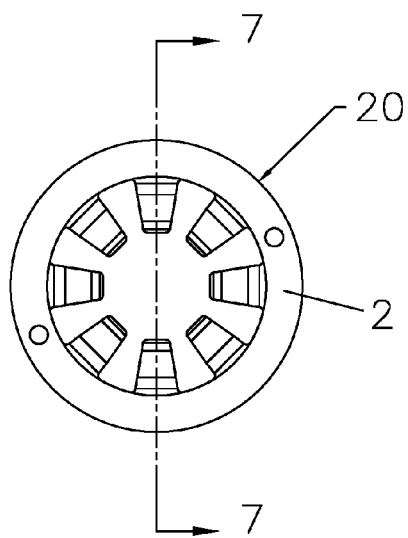
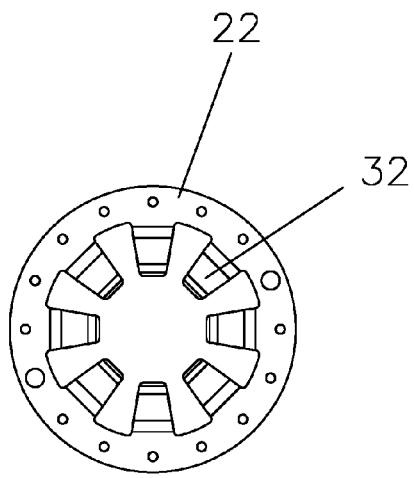
Fig. 6
Fig. 8
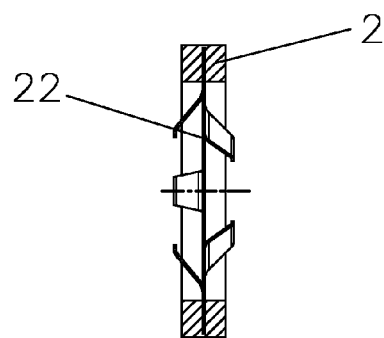
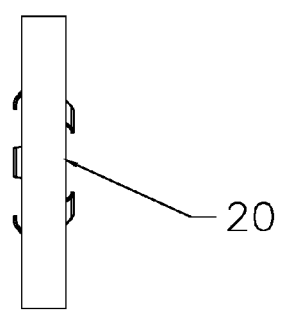
Fig. 7
Fig. 9

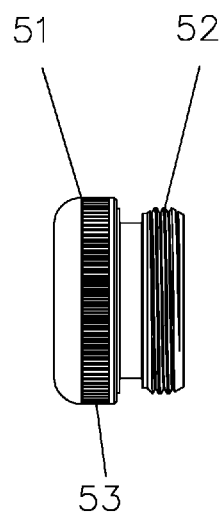
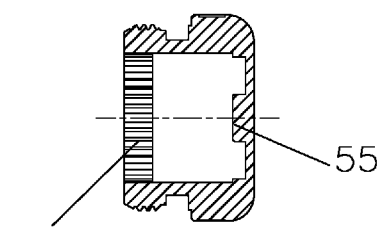
Fig. 26  Fig. 27  Fig. 28

METHOD AND APPARATUS FOR MINIMIZING BATTERY CORROSIVE ELECTROLYTE LEAKAGE

CROSS REFERENCE TO RELATED APPLICATIONS

This application is a continuation application of Ser. No. 14/869,628 and also Ser. No. 14/869,962, both of which were filed Sep. 29, 2015, the disclosures of both of which are specifically incorporated herein by reference.

FIELD OF THE INVENTION

The present invention is in the field of minimizing battery corrosive electrolyte leakage from devices that use batteries, including alkaline and rechargeable batteries, and is especially concerned with minimizing battery corrosive electrolyte leakage in portable, hand-held devices, one example of which is a flashlight, which use batteries held in a battery compartment in an in series arrangement.

BACKGROUND OF THE INVENTION

Batteries of all sizes and types, including chargeable and non-rechargeable, are used in a variety of devices to provide power to electrical circuits.

Alkaline batteries have provided power to consumer and hand-held devices, one example of which is a flashlight, for decades. A general description of the construction of alkaline batteries is described in the prior art, an example of which is the article found at http://www.electrical4u.com/alkaline-batteries, as well as a technical bulletin about Duracell® batteries found at http://ww2.duracell.com/en-US/Global-Technical-Content-Library/Technical-Bulletins.jspx, both of which are incorporated by reference herein, from which FIG. 1 and the following description of such construction is obtained. The body of a battery, generally designated as 100, is made of a hollow steel can 102 comprised of an outer cylindrical wall 102OC, a top surface 102TC and a bottom surface 102BC. Can 102 contains all materials of the battery. A positive cap with a nipple 103 of battery 100 is projected from the top of can 102. A manganese dioxide cathode powder mix 104 is pressed against the inner steel wall of can 102 so that the steel case of the can becomes the cathode current collector and serves as the positive terminal of the cell. The inner surface of the thick layer of cathode mixture is covered with a porous separator 105 which isolates the electrodes of the battery. The central space, inside separator 105, is filled by a zinc anode powder 106. The porous nature of the anode, cathode, and separator materials allows them to be thoroughly saturated with the alkaline electrolyte solution. A metallic pin 107 is welded to the external anode cap 111 and extends through a plastic cap or grommet 109 into the center of the anode powder mix maintaining intimate contact. This pin is called a negative collector pin or an anode current collector. Plastic cap or grommet 109 is sealed to the steel can 102 by means of radial crimping pressure and a sealant. Anode cap 111 is electrically isolated from the positive cell case 102 with an insulator 110. A vent mechanism 112 is incorporated into the plastic grommet 109 to protect against cell rupture. An outer insulative wrapping 102W is also commonly applied to can 102 which is also used to contain printed material, such as trademarks and trade dress of the battery manufacturer.

Batteries, including alkaline batteries, are often aligned in series, in which a positive terminal of one battery is in direct contact with a negative terminal of another battery. Using a flashlight as an example, it is well known in the prior art to include a battery compartment, such as a barrel, in which batteries (such as AAA, AA, C or D cell size) are aligned in series. While such an arrangement is the common and traditional arrangement, there have been prior suggestions that steps be taken to protect battery electrodes in a series arrangement where two batteries connect with each other, such as through the use of a battery spacer and resilient conductor as taught in U.S. Pat. Nos. 5,645,955 and 5,795,675.

However, despite the fact that batteries, including alkaline batteries, have been used in a variety of devices for decades, there has been a well-known problem that batteries can leak battery corrosive electrolyte over time, causing problems related to cleaning such leaks and sometimes ruining a device in which the leak occurs.

Accordingly, the present invention addresses a long-felt need for a way to minimize battery corrosive electrolyte leaks in devices that use batteries, including but not limited to, flashlights.

SUMMARY OF THE INVENTION

The present invention is generally directed to reducing battery corrosive electrolyte leak by using spacers (which can be made of a shock absorbing material) between each pair of batteries held in the series configuration so that a resilient contact provides an electrical contact between the pair of batteries and the thickness of the spacer prevents a second end of a first battery from contacting the first end of the second battery.

Accordingly, it is a primary object of the present invention to minimize battery corrosive electrolyte leakage in devices in which batteries are held in a series configuration.

This and further objects and advantages will be apparent to those skilled in the art in connection with the drawings and the detailed description of the invention set forth below.

BRIEF DESCRIPTION OF THE DRAWINGS

FIG. 6 is a top view illustrating a second design of a shock absorbing spacer assembly in accordance with the present invention, FIG. 7 is a cross sectional view of FIG. 6, FIG. 9 is a side view of FIG. 6 and FIG. 8 illustrates a resilient contact used in the assembly of FIG. 6.

FIG. 24 illustrates a flashlight the shock absorbing spacer of FIG. 2 being used in a flashlight while

FIG. 26 illustrates an outer member of a tail cap that receives an inner member of a tail cap illustrated in FIG. 29 in accordance with the present invention. FIG. 27 is an end view of the outer member of FIG. 26 while FIG. 28 is a cross sectional view of FIG. 27. FIG. 30 is an end view of the inner member of FIG. 29 while

FIG. 33 illustrates the inner member of FIG. 29 screwed into the threads of a flashlight barrel with the male and female splines of inner and outer tail cap members of FIGS. 26 and 29 engaged while

FIG. 35 is an assembled two piece tail cap, illustrated in FIGS. 26 and 29, except that a shock absorbing material 202 has been added to the inner member while

FIG. 39 illustrates a replacement tail cap with a terminal end shock absorber in accordance with the present invention while

FIG. 41 illustrates a second replacement tail cap with a terminal end shock absorber in accordance with the present invention while

DETAILED DESCRIPTION OF THE INVENTION

Figure 1:
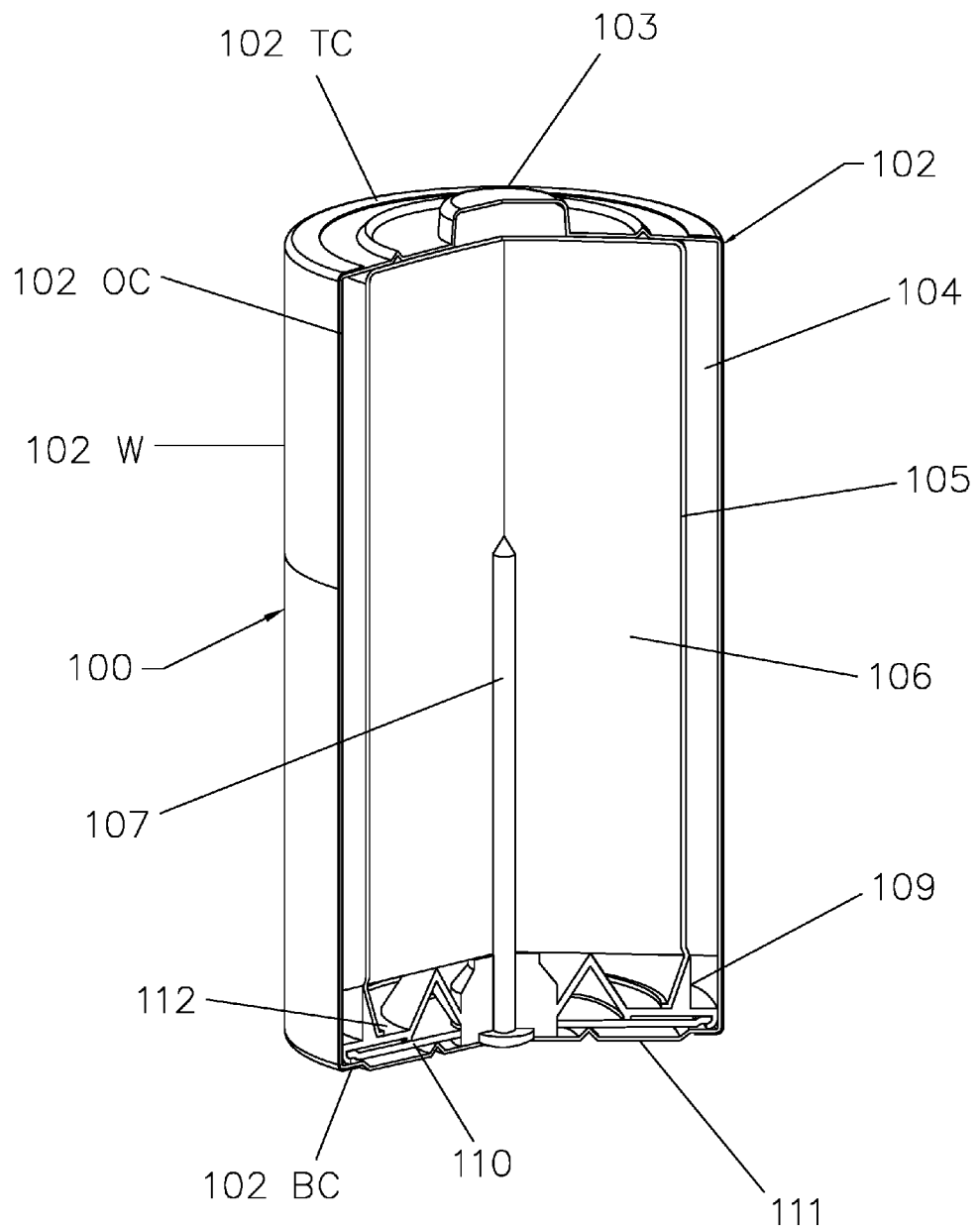
FIG. 1 illustrates a cutaway view of a Duracell® cylindrical alkaline battery which constitutes prior art.
Figure 2:
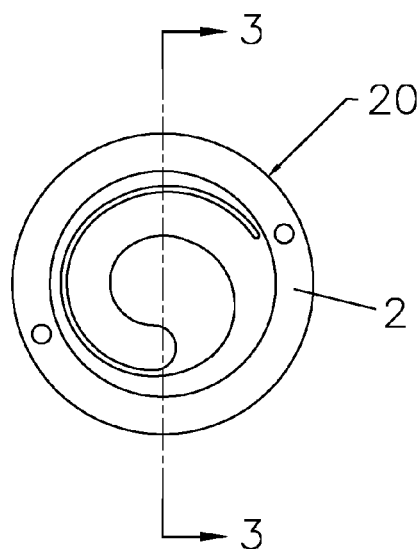
FIG. 2 is a top view illustrating a first design of a shock absorbing spacer assembly in accordance with the present invention.

In the Figures and the following detailed description, numerals indicate various physical components, elements or assemblies, with like numerals referring to like features throughout both the drawings and the description. Although the Figures are described in greater detail below, the following is a glossary of elements identified in the Figures.
1 flashlight
2 shock absorbing spacer
11 barrel of flashlight 1
11T thread of barrel 11
12 head of flashlight 1
13 light source of flashlight 1
14 tail cap of flashlight 1
20 shock absorbing spacer assembly
22 resilient contact
22H hole in resilient contact 22
22GH guide hole in resilient contact 22
31 curling arm of resilient contact 22
32 ear of resilient contact 22
40 spring
41 lock ring
42 lip seal
51 outer member of tail cap
52 thread of member 51
53 knurl
54F female spline
55 spring contact
57 central bore
61 inner member of tail cap
62 thread of member 61
64M male spline
65 battery can engaging surface
100 battery
100(1) first of two batteries in a series configuration
100(2) second of two batteries in a series configuration
102 can
102BC bottom surface of can 102
102OC outer cylindrical wall of can 102
102TC top surface of can 102
102W battery wrap
103 positive cap with nipple
104 cathode powder
105 porous separator
106 anode powder
107 negative collector pin or anode current collector
109 plastic cap or grommet
110 electrical insulator
111 anode cap
112 vent mechanism
202 shock absorbing material
301 modified shock absorbing spacer
302 spring
303 tail cap Generally speaking, when two or more cylindrical batteries are held in a series configuration in a battery compartment, a top surface of each of the batteries has a nipple contact while the bottom surface of each of the batteries has a generally flat surface, and the top nipple contact is traditionally a positive or cathode contact while the bottom flat contact is traditionally a negative or anode contact. The battery compartment which holds the batteries in a series configuration traditionally has a top contact against which a first battery in the series is loaded and a compression spring that serves both as an electrical contact for the last battery in the series (hereinafter the terminal battery) and as a biasing means so as to keep the batteries in series held in electrical contact by biasing the bottom flat contact of the terminal battery toward the top contact.

While the present invention is not limited to use with flashlights, and is applicable to any device with a battery compartment in which two or more batteries are held in a series configuration, the present invention will hereinafter be described and illustrated, for ease of understanding, by reference to only one specific device—a flashlight, examples of which are described in U.S. Pat. Nos. 6,361,183 and 8,366,290, the disclosures of which are specifically incorporated by reference herein.

In a flashlight 1 the terminal battery is the last battery which is inserted into barrel 11 of the flashlight and the terminal battery is biased toward head 12 of the flashlight, which contains light source 12, by a compression spring included in a tail cap 14 which seals off the barrel after the batteries have been inserted and the tail cap is screwed on and into place.

While it is traditionally the case that the bottom flat contact of a first battery in a series configuration (which is inserted into a flashlight barrel before the next or second battery in a series configuration) is in both physical and electrical contact with a top nipple contact of the second battery in the series configuration, in accordance with one aspect of the present invention, such physical contact is prevented by a shock absorbing spacer inserted between the first and the second batteries in the series configuration.

In an especially preferred embodiment of the present invention, a shock absorbing spacer 2 is configured as a disc which has a circular outer cross section which is of substantially the same diameter as the diameter of the two cylindrical batteries it is inserted between and an inner cross section which is of substantially the same diameter as that of the bottom surface 102BC of the first battery and/or the top surface 102TC of the second battery. It is especially preferred that shock absorbing spacer 2 have a thickness sufficient so as to keep the top nipple contact of the second battery in the series configuration from coming into contact with the bottom flat contact of the first battery in the series configuration, even when the flashlight is subjected to extreme shock, such as, for example, being dropped from a distance of several meters, or more. Accordingly, the thickness of the shock absorbing spacer should be greater than the height of the nipple of the top nipple contact, and take into account variations in such height in various batteries, as well as any compression of the shock absorbing spacer when it is performing its shock absorbing function under anticipated or desired performance criteria. The shock absorbing spacer can be made of any material that absorbs shock, such as energy-absorbing plastic or rubber, and it is especially preferred that the material be a cushioning material that absorbs a proportion of the kinetic energy arising when the flashlight suffers impact or is dropped, while still having sufficient recovery that the shock absorbing spacer will continue to function over time.

Figure 25:
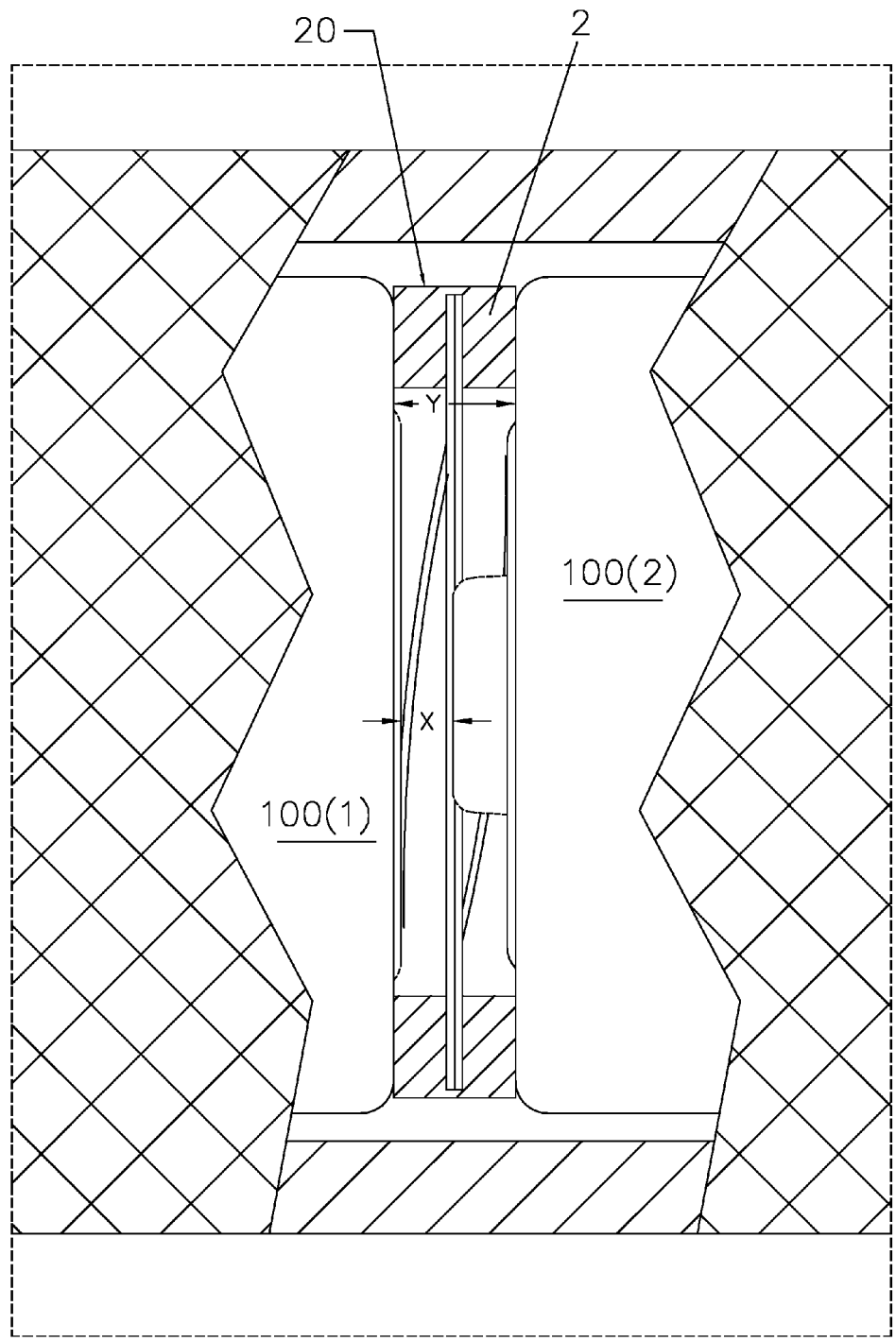
FIG. 25 is a close up view of a portion of FIG. 24.
Figure 32:
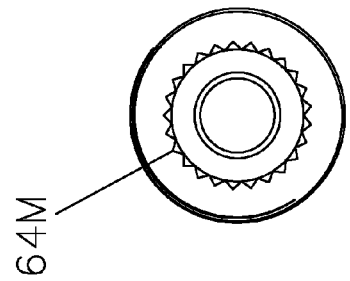
FIG. 32 is an end view looking at the back side of FIG. 31.
Figure 31:
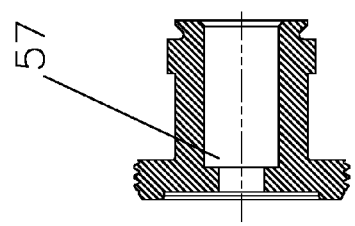
FIG. 31 is a cross sectional view of FIG. 30
Figure 30:
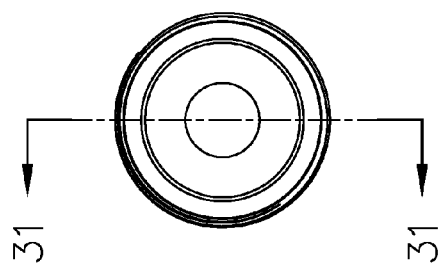
Figure 29:
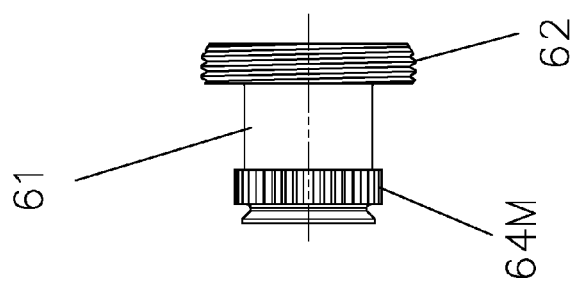

Because shock absorbing spacer 2 keeps the top nipple contact of the second battery in the series configuration 100(2) from coming into contact with the bottom flat contact of the first battery in the series configuration 100(1), the two terminals must be electrically connected, and, in an especially preferred embodiment of the present invention, this is done by at least one resilient contact held by the shock absorbing spacer in a shock absorbing spacer assembly 20, and the electrical contact with the top nipple contact is made with the base below the nipple, or outer diameter of the nipple (less preferably), but not the top surface of the nipple, as illustrated in FIG. 25 in which shock absorbing spacer 2 has a thickness of Y whereas the distance between the top nipple contact of the second battery 100(2) and the bottom flat contact of the first battery 100(1) is X. The reason it is especially preferred that the at least one resilient contact not contact the top of the nipple is that reliance on such contact would mean that shock absorbing spacer 2 would need to be thicker so that a shock would not allow energy to be passed from the nipple through the resilient contact to the bottom flat contact.

The at least one resilient contact can take on many different forms, some preferred embodiments of which are illustrated in FIGS. 4, 8, 12, 16, 18, 20 and 22.

Figure 4:
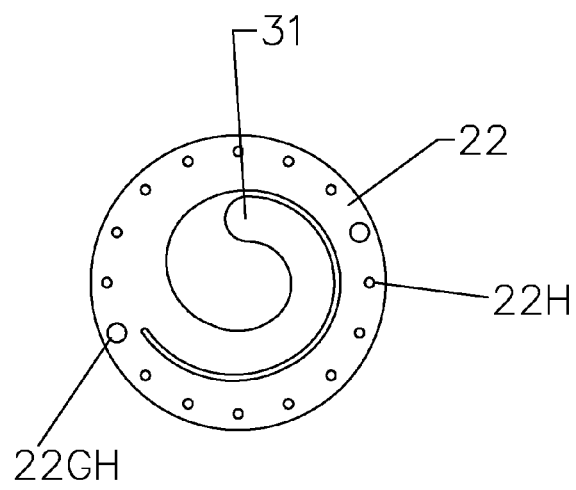
FIG. 4 illustrates a resilient contact used in the assembly of FIG. 2.
Figure 3:
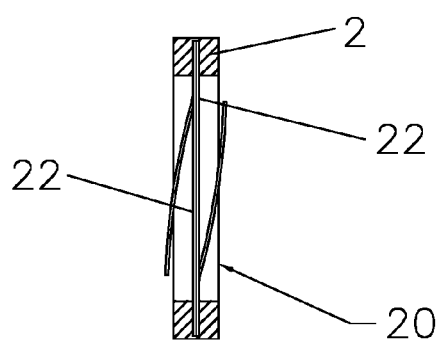
FIG. 3 is a cross sectional view of FIG. 2.
Figure 5:
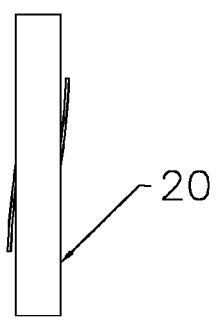
FIG. 5 is a side view of FIG. 2

In FIG. 4, resilient contact 22 is formed from stamped metal with a plurality of holes 22H, two guide holes 22GH, and a curling arm 31. Two mirror imaged contacts 22 are mounted opposite of each other (see FIG. 3), with their holes 22H and guide holes 22GH aligned, and then shock absorbing spacer 2 is molded so that its material fills holes 22H but leaves guide holes 22GH unfilled, for later use in assembly, to form shock absorbing spacer assembly 20.

Figure 10:
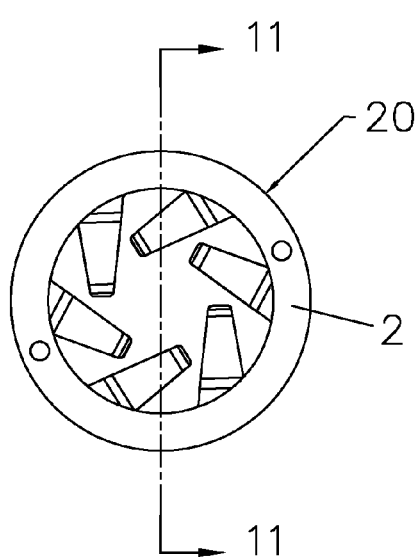
FIG. 10 is a top view illustrating a third design of a shock absorbing spacer assembly in accordance with the present invention.
Figure 12:
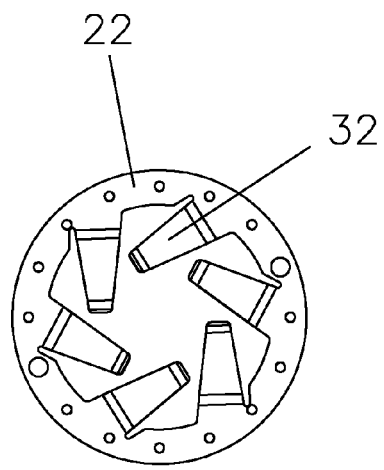
FIG. 12 illustrates a resilient contact used in the assembly of FIG. 10.
Figure 11:
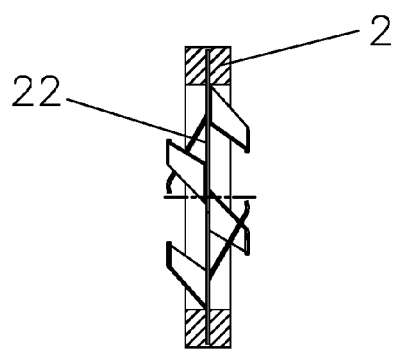
FIG. 11 is a cross sectional view of FIG. 10.
Figure 13:
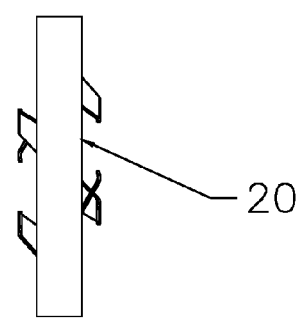
FIG. 13 is a side view of FIG. 10
Figure 14:
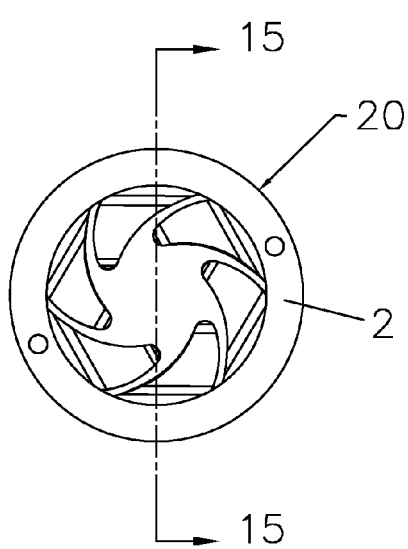
FIG. 14 is a top view illustrating a fourth design of a shock absorbing spacer assembly in accordance with the present invention.
Figure 16:
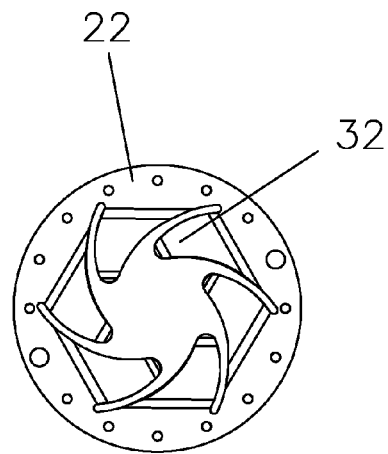
FIG. 16 illustrates a resilient contact used in the assembly of FIG. 14.
Figure 15:
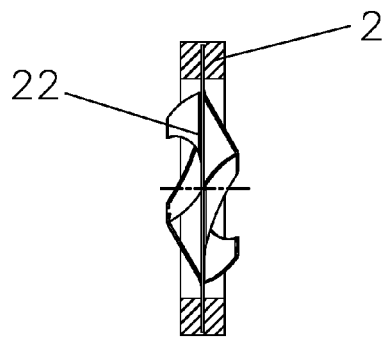
FIG. 15 is a cross sectional view of FIG. 14.
Figure 17:
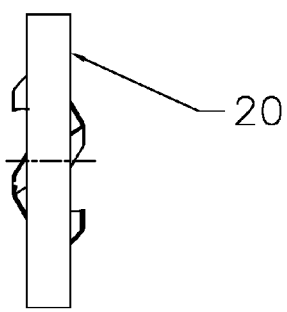
FIG. 17 is a side view of FIG. 14

In FIGS. 8, 12 and 16, a single resilient contact 22 is formed from stamped metal, but multiple ears 32 are bent in opposing directions as illustrated in FIGS. 7, 11 and 15, respectively, and the ears of the different embodiments have different configurations. A shock absorbing spacer 2 is molded around the single resilient contacts 22 to form the different embodiments of shock absorbing spacer assembly 20 illustrated in FIGS. 6, 10 and 14.

Figure 18:
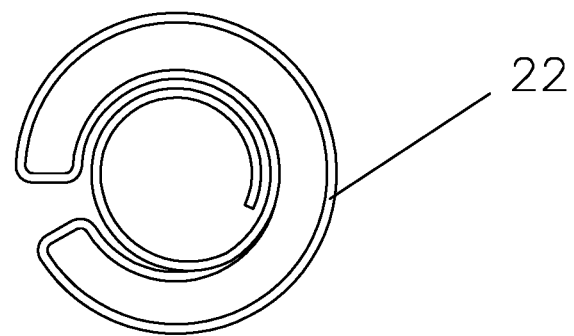
FIGS. 18, 20 and 22 each illustrate a spring design that can be used in a shock absorbing spacer assembly in accordance with the present invention as illustrated in FIGS. 19, 21 and 23, respectively.
Figure 19:
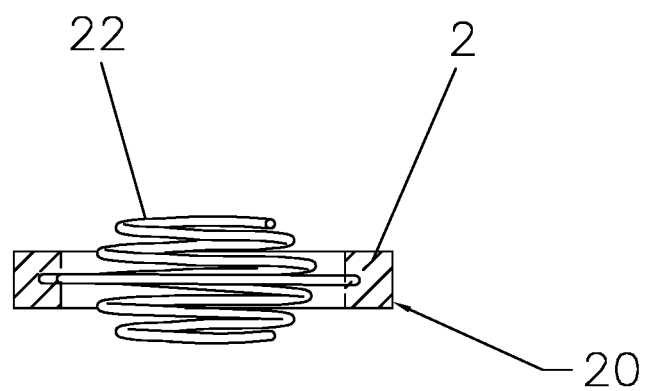
Figure 20:
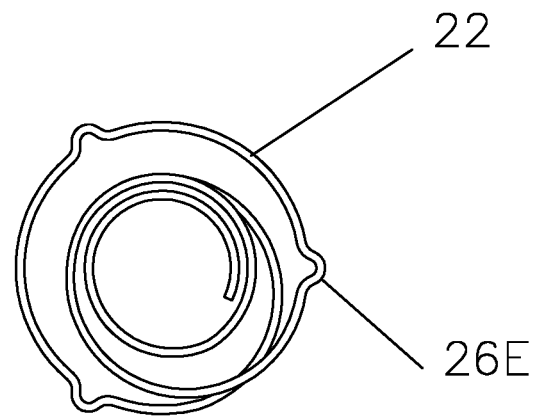
Figure 21:
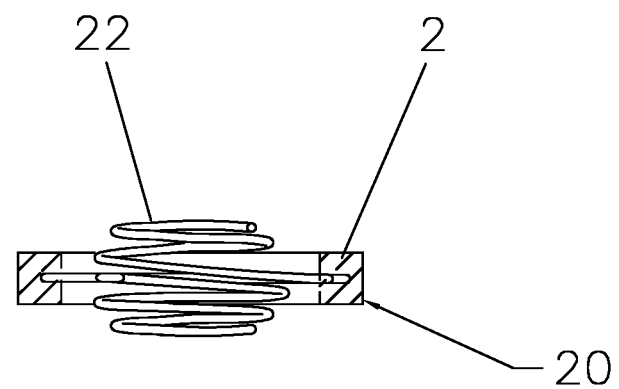
Figure 22:
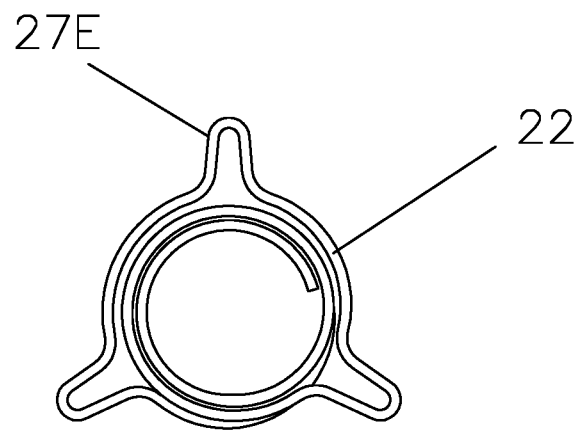
Figure 23:
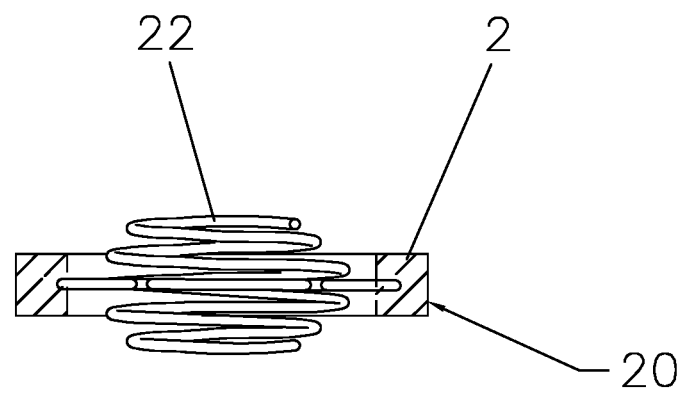
Figure 24:
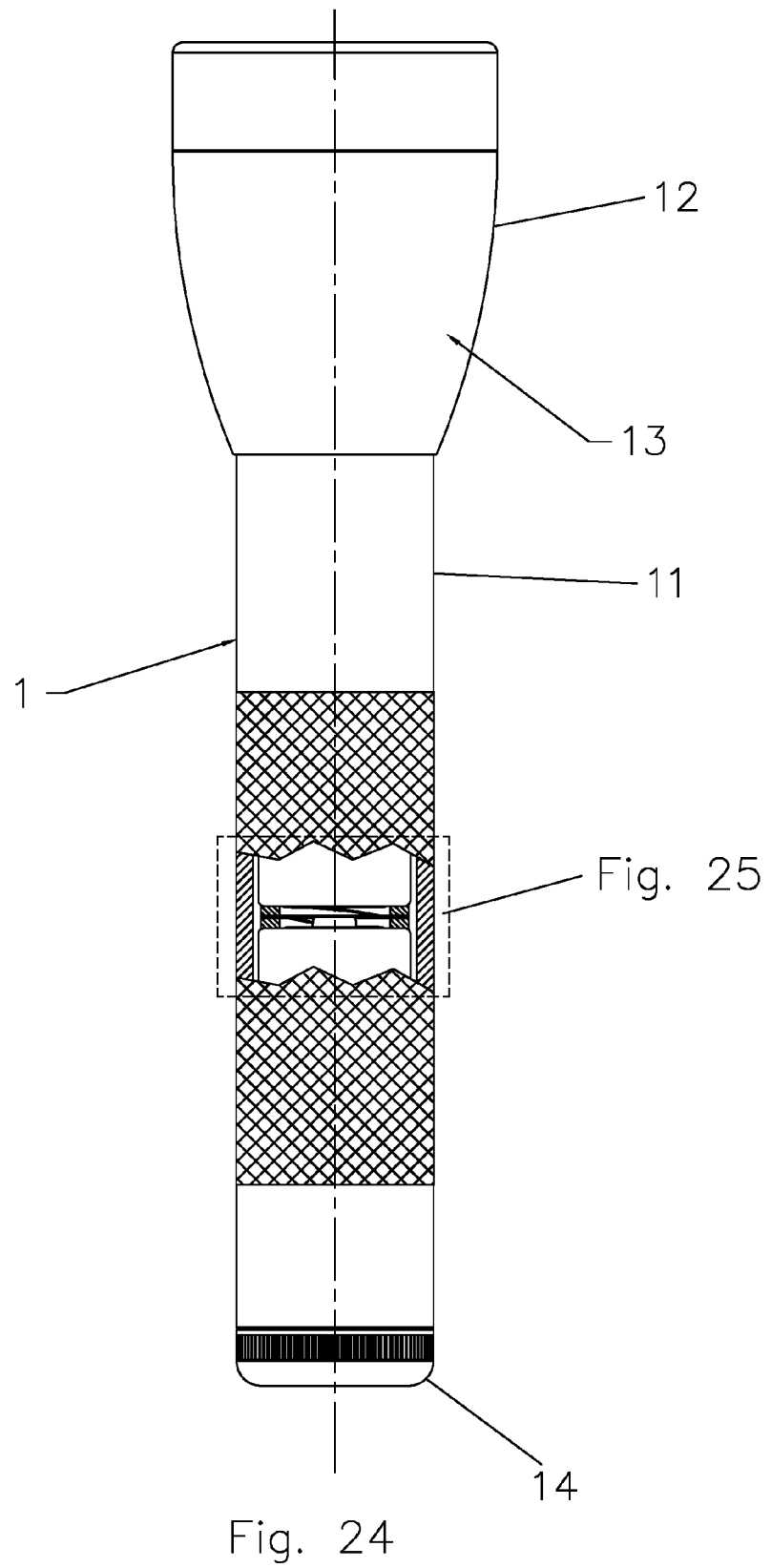

In additional embodiments, resilient contact 22 can be a spring, examples of shapes of which are illustrated in FIGS. 18, 20 and 22, and such springs can be secured within shock absorbing spacer 2 by molding to form shock absorbing spacer assemblies as illustrated in FIGS. 19, 21 and 23, respectively.

Shock absorbing spacer assemblies 20 can easily be dropped in between batteries as batteries are being loaded into a barrel 11 of a flashlight 1; one shock absorbing spacer assembly should be inserted between every two batteries; accordingly, a flashlight having two batteries in series will use one shock absorbing spacer assembly between the two batteries; a flashlight having three batteries in series will use two shock absorbing spacer assemblies between the first and second, and the second and third batteries; a flashlight having four batteries in series will use three shock absorbing spacer assemblies between the first and second, the second and third, and the third and fourth batteries, and so on, so that the number of shock absorbing spacer assemblies used in a barrel will equal one less than the number of batteries arranged in a series configuration. In view of the ease of such assembly, it is easy to see why it is especially preferred that shock absorbing spacer 2 and resilient contact 22 form a single assembly; however, resilient contact 22 could also be detached from shock absorbing spacer to accomplish the same functional purpose, albeit with the need for a more difficult assembly process.

Use of shock absorbing spacer assemblies 20 between two batteries in a series arrangement allows energy imparted during a shock to be absorbed by the shock absorbing spacer assemblies and also imparts substantially all of the shock between bottom surface 102BC of can 102 of the first battery and top surface 102TC of can 102 of the second battery in a series arrangement, rather than imparting shock to either bottom flat contact 111 of the first battery or top nipple contact 103 of the second battery.

In another aspect of the present invention, a terminal end shock absorber is positioned so that the terminal end of a terminal battery in a series configuration will be cushioned by the terminal end shock absorber when a force is applied to the series configuration causing the two or more cylindrical batteries to move toward a terminal retaining member (which is a tail cap 15 in flashlight 1).

In some situations, it may be possible to use a shock absorbing spacer 20 as a terminal shock absorber, depending upon how electrical contact is made with a tail cap, how the tail cap fits into a closed electrical circuit, and how much space there is between bottom flat contact 111 of the terminal battery and its contact point within the tail cap. In an especially preferred embodiment of the present invention, a specially designed tail cap assembly is used to provide a terminal end shock absorber.

Because many different devices make contact with the terminal end of a terminal battery in different ways, even in one device category, such as a flashlight, it is worth noting that sometimes a strong spring is used to make such contact; however, if one is designing a particular device, especially where cylindrical batteries are inserted into a cylindrical tube, one way to minimize the amount of stress that might be applied to the terminal end of the terminal battery is to insure a snug fit so there is less room for the batteries to move in the event of extreme shock.

One of the reasons why batteries may not enjoy a snug fit is variations in tolerance and production specifications/actual manufactured dimensions of batteries. As more batteries are aligned in a series configuration, there is a greater possibility of cumulative variations. In accordance with one aspect of the present invention, a snug fit is created by the combination of eliminating variations between pairs of batteries with a spacer (which can either be a shock absorbing spacer, as already disclosed, or a non-shock absorbing spacer having the same construction except for the use of a non-shock absorbing material) and then insuring a snug fit by creating a snug mechanical fit at the bottom surface of the can of the terminal battery. Use of spacers between adjoining battery terminals helps cancel variations in dimensions of the batteries because variations in positive cap 103 or anode cap 111 are no longer important since the spacer is held between bottom surface 102 BS of the first battery and top surface 102TC of the second battery, and the width of the spacer is greater than the nipple of positive cap 103. Accordingly, when a snug fit is created at bottom surface 102B of the terminal battery, that snug fit will ensure that the cans of the batteries in the series configuration, with spacers between each pair of batteries, create a solid continuous length of material in which no meaningful force is applied to the battery terminals between two adjoining batteries while the terminal end of the terminal battery is retained at its can, rather than at its anode cap.

Figure 33:
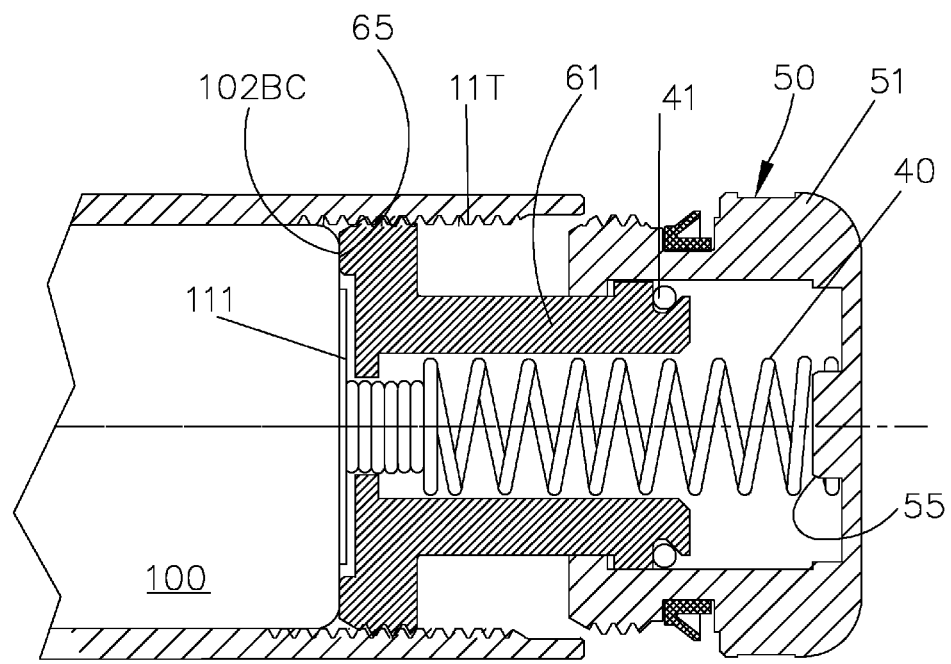
Figure 34:
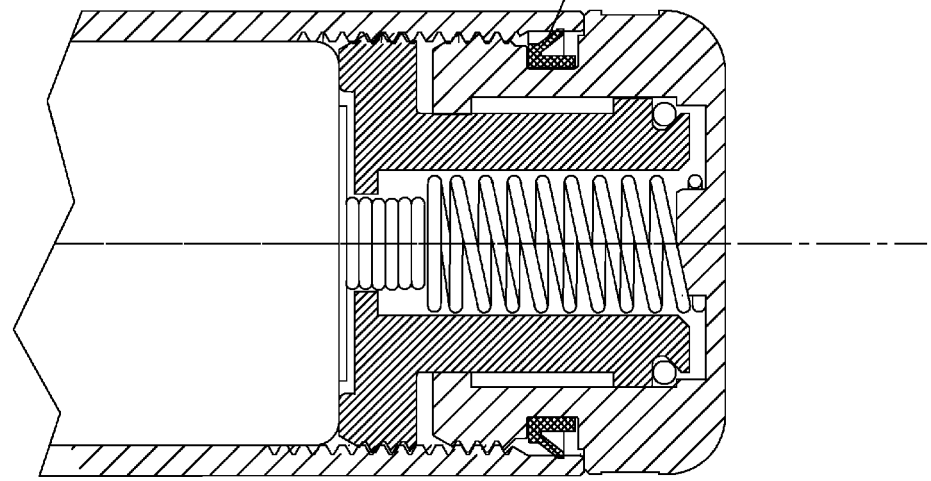
FIG. 34 shows the outer tail cap member of FIG. 33 screwed into the inner tail cap member.
Figure 35:
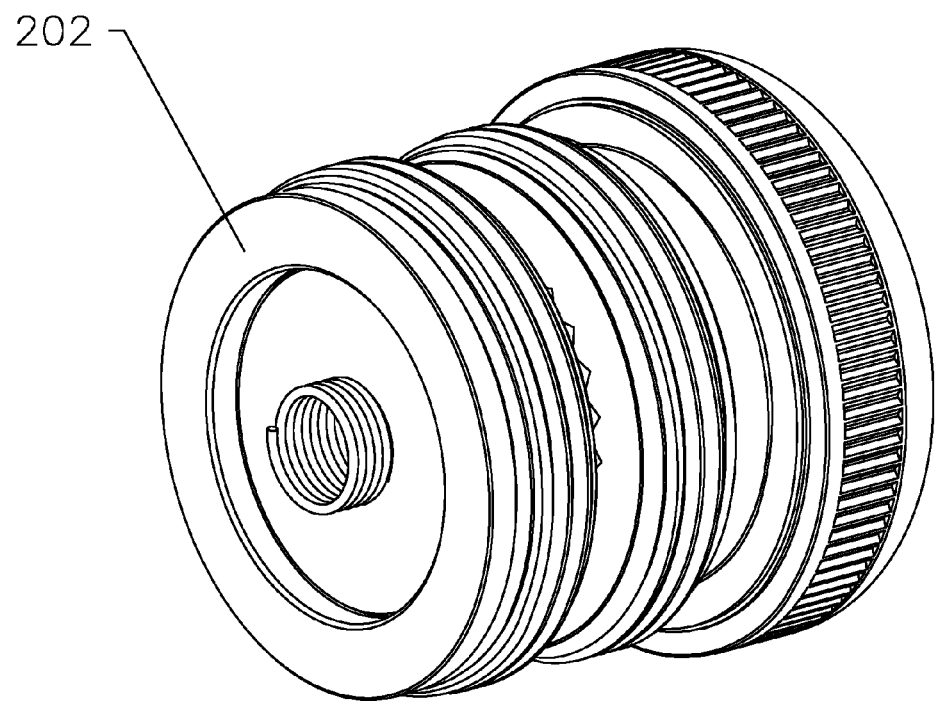
Figure 36:
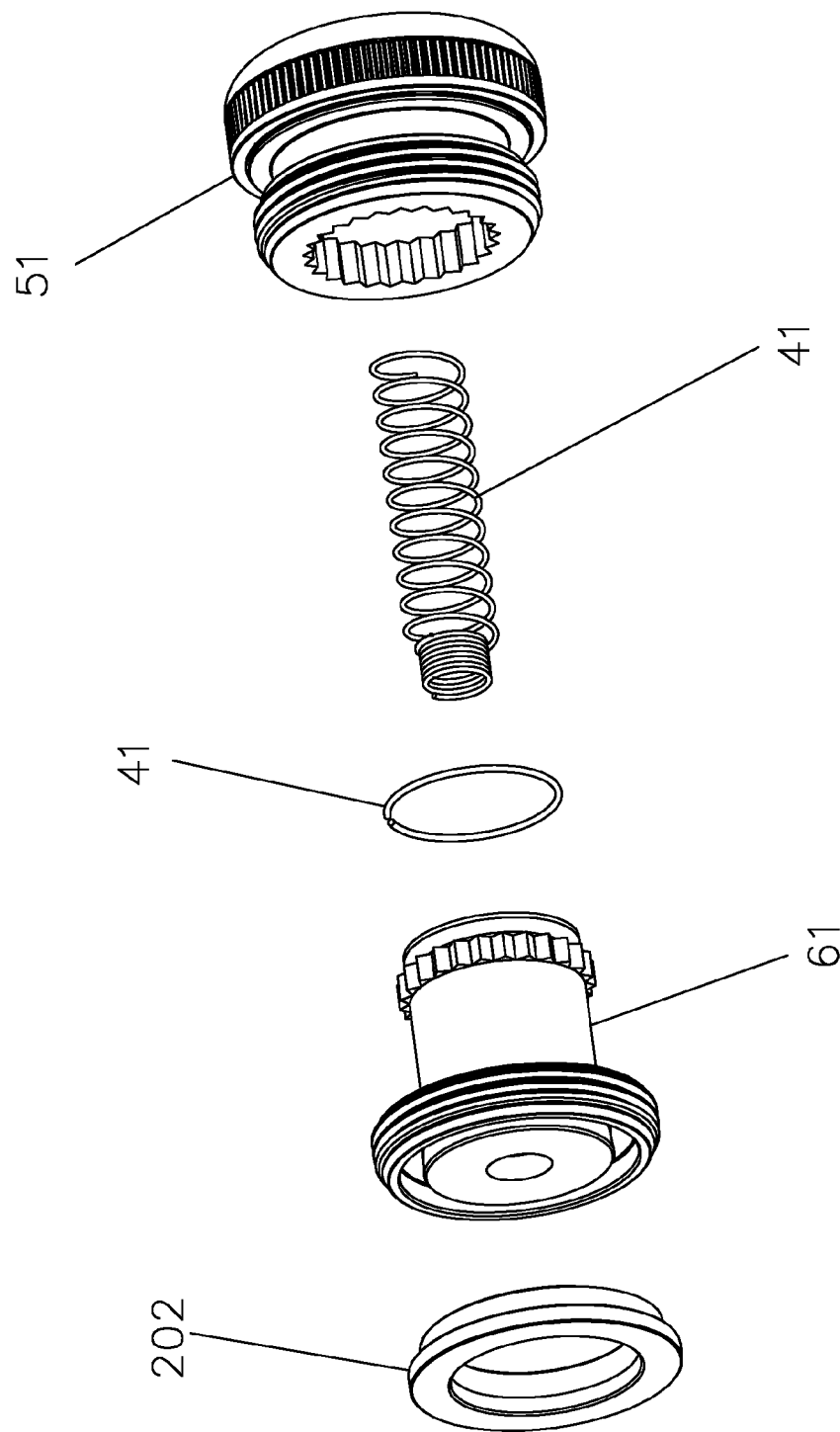
FIG. 36 is an exploded view of the assembly of FIG. 35 and FIGS. 37 and 38 are identical to FIGS. 33 and 34 except for the addition of shock absorbing material 202.
Figure 37:
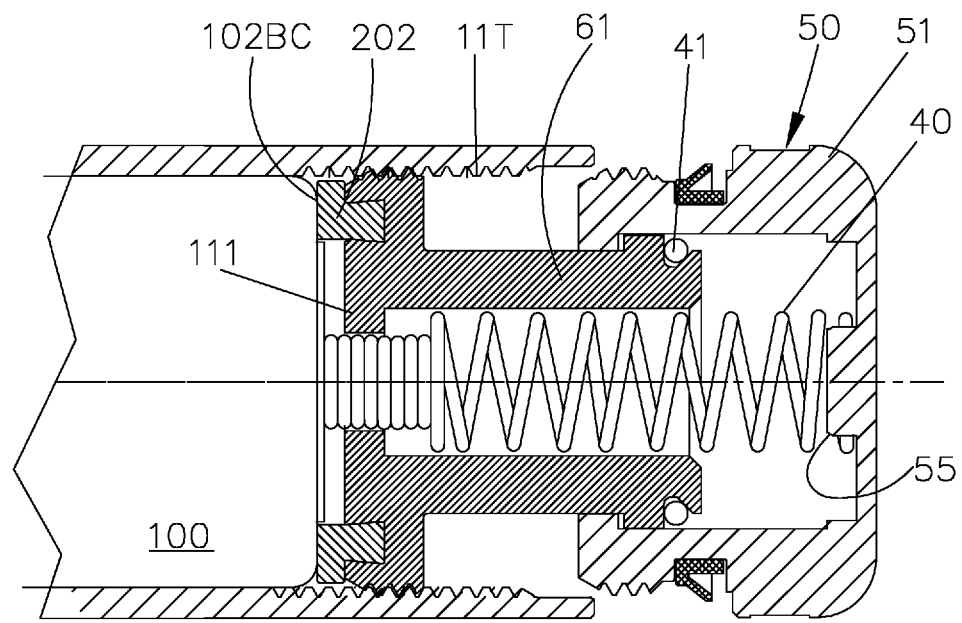
Figure 38:
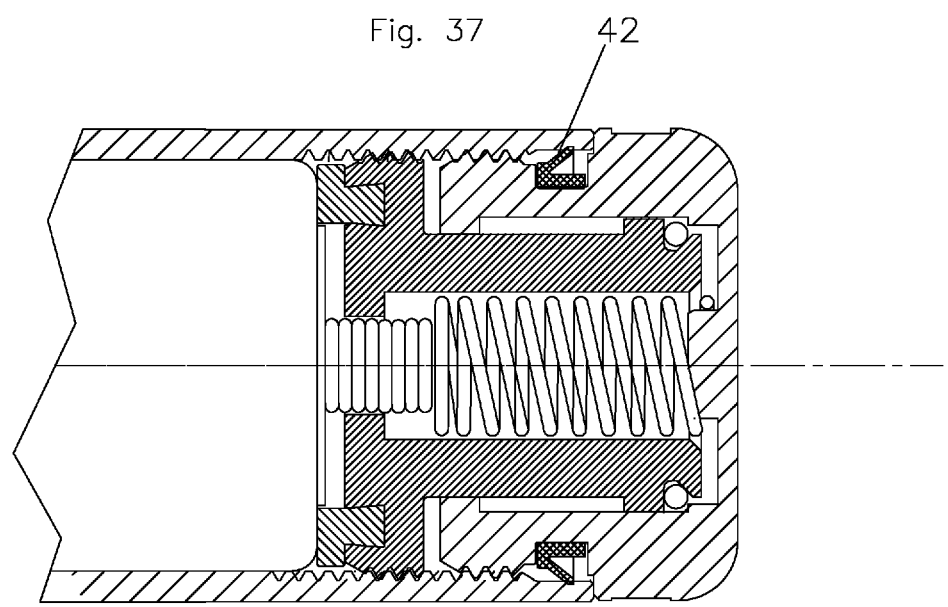

One especially preferred embodiment of a device which creates a snug fit for the terminal end of a terminal battery is a mechanical contact that can be tightened against the bottom surface 102 of the terminal battery until a snug fit is obtained, and one example of such a device is disclosed in FIGS. 26-32, which is especially useful for the device category of a flashlight, in which a two piece tail cap is provided in which an inner member 61 of the tail cap 50 can be driven by an outer member 51 of tail cap 50 to screw into flashlight barrel threads 11T so that bottom surface 102BC of the terminal battery is held snugly by battery can engaging surface 65 of inner member 61 as illustrated in FIG. 33. In this especially preferred embodiment, mating splines are used to illustrate one mechanical driving mechanism; however, this embodiment is meant to be illustrative, rather than limiting, and any other suitable driving mechanism could also be used in alternative embodiments within the scope of the present invention. Returning to FIG. 33, inner member 61 is driven by engaging female splines 54F in outer member 51 of tail cap 50 with male splines 64M of inner member 61 and then using outer member 51 to screw inner member 61 into position; once inner member 61 is fully screwed into position, female splines 54F and 64M are disengaged and threads 52 of outer member 51 are then screwed into flashlight barrel threads 11T to secure outer member 51 to barrel 11 as illustrated in FIG. 34. It is especially useful if a lock ring 41 is used to secure outer member 51 (which has a lip seal 42) to inner member 61 (see FIGS. 33 and 34); inner member 61 and lock ring 41 can be designed so that lock ring 41 will not be removable once it is in place or so that it can be removable with a certain amount of force. Because the two piece construction of tail cap 50 allows battery can engaging surface 65 to snugly hold bottom surface 102BC of the terminal battery (and it is especially preferred that battery can engaging surface 65 engage all or substantially all of bottom surface 102BC, but not anode cap 111), an electrically conductive spring 40 may or may not be required, depending upon whether bottom surface 102BC is insulated, such as by a battery wrap 102W; but, even if it is required, conductive spring 40 need not be a strongly compressed spring and can have a minimum contact force (of around 200 grams or 0.44 lbs.)—just enough to ensure electrical contact, but not so much that it will provide a mechanism for imparting a damaging force to the terminal end of the terminal battery in the event of extreme shock. (Springs used in tail caps of prior art flashlights to create a biasing means forcing the batteries toward the top contact could have a much higher contact force, on the order of 10 lbs. or more.) Spring 40, as illustrated in FIG. 33, can be secured by spring contact 55.

One way of minimizing any potential damaging force that spring 40 might impart to the terminal end of the terminal battery in the event of extreme shock is to minimize its length and strength. FIGS. 35-41 illustrate an alternative embodiment of a two piece tail cap in which a central bore 57 in which spring 40 is held is minimized so that a shorter spring can be used for ensuring electrical contact between the terminal end of the terminal battery and the tail cap.

The two piece tail cap construction described so far can also be used in devices that utilize rechargeable battery packs, an example of which is a NiMH battery for the Mag Charger® LED flashlight. In such a device, multiple rechargeable batteries are wrapped together in a snug casing, which is electrically insulating, so the terminal end of the terminal battery extends out of the casing, and a button end of a first battery also extends out of the casing, but the other ends of the batteries held in series are held tightly together inside of the battery wrap. In such a device, while shock absorbing spacers 2 might be used inside of the casing when the battery pack is manufactured, it is not possible to use shock absorbing spacers 2 with existing battery packs without destroying the battery wrap, which is not desirable; however, the two piece tail cap construction already described will still prove useful with such battery packs.

The two piece tail cap construction already described can also be modified to provide a shock absorbing spacer 202 that makes contact with bottom surface 102BC of the terminal battery, and FIGS. 35-38 illustrate one example of how such a shock absorbing spacer can be provided. In this especially preferred embodiment, shock absorbing spacer 202 is held or mounted to inner member 61 of tail cap 50, shock absorbing spacer 202 is configured to absorb a primary impact force imparted between it and bottom surface 102BC of can 102, and shock absorbing material 202 may be similar or identical to that used in shock absorbing spacer 2. Such construction is also especially preferred for use with rechargeable battery packs that do not utilize shock absorbing spacers between batteries contained with the battery packs.

Because there are millions of flashlights already in use, it is also desirable to provide a kit and method by which such existing flashlights can benefit from the teachings of the present invention.

As already noted, flashlights in use today typically have a compression spring that serves both as an electrical contact for the terminal battery and as a biasing means so as to keep the batteries in series held in electrical contact by biasing the bottom flat contact of the terminal battery toward the top contact. This means that the compression spring is usually fairly strong, and it exerts a strong compressive force against bottom flat contact 111 of the terminal battery (not just to maintain electrical contact, but also to keep the batteries biased toward the top contact); however, when the battery receives a shock, movement of the batteries against the strong compression spring causes the spring to further compress, applying even greater compression force against bottom flat contact 111. By contrast, the present invention seeks to minimize the compressive force applied against bottom flat contact 111 of the terminal battery and to rely upon a terminal end shock absorber to both absorb some shock as well as transfer energy through bottom surface 102BC of can 102 of the terminal battery, rather than through bottom flat contact 111.

Figure 39:
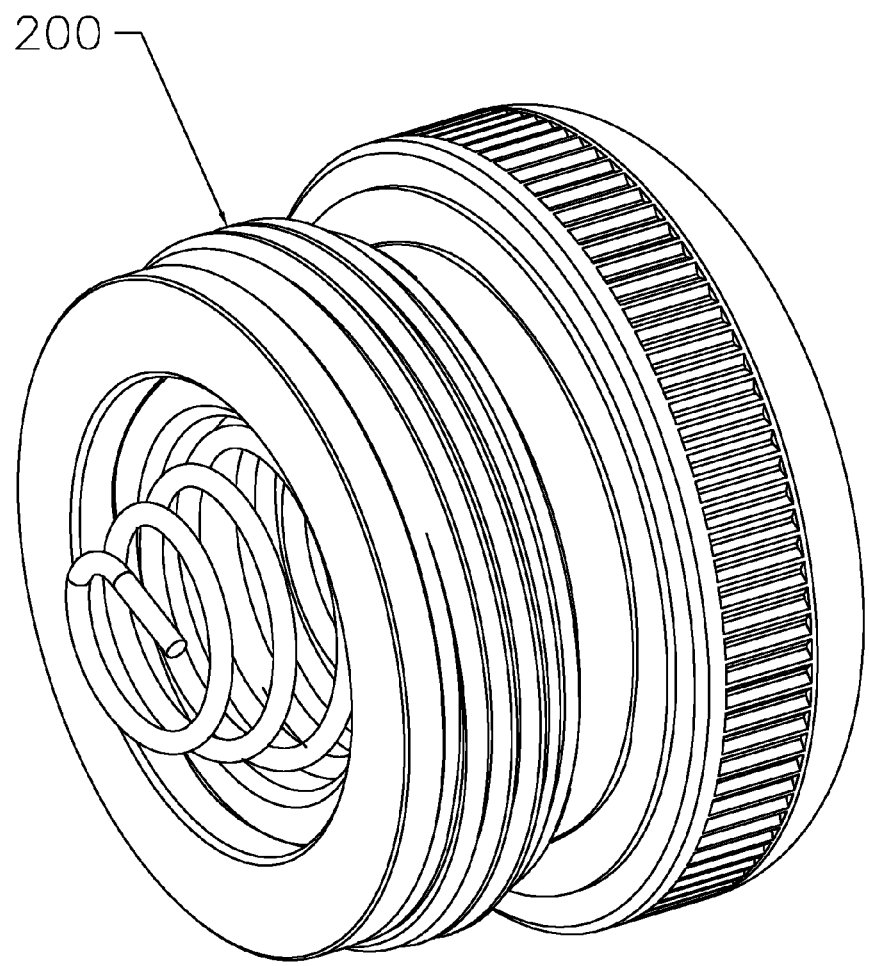
Figure 40:
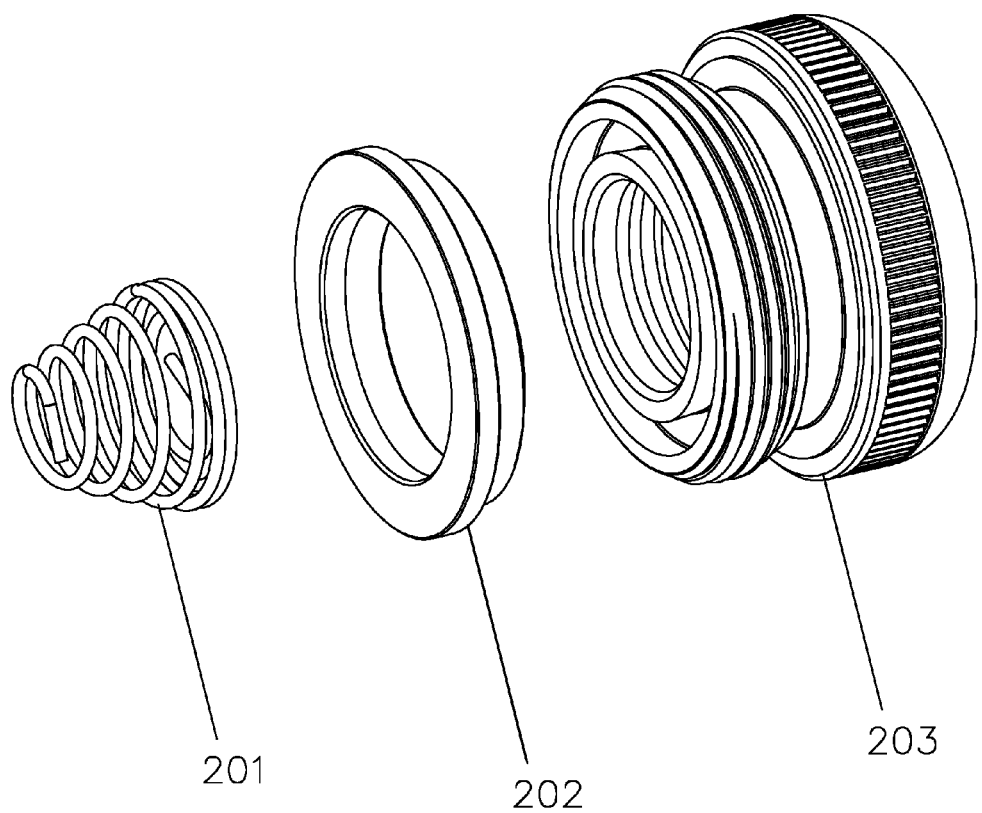
FIG. 40 is an exploded view of FIG. 39.

One way a flashlight can be retrofitted with a terminal end shock absorber in accordance with the present invention is to replace an existing tail cap assembly with its compression spring with a new tail cap assembly 200 such as is illustrated in FIGS. 39 and 40. Replacement tail cap assembly 200 utilizes a shock absorbing material 202, a tail cap resilient contact 201 and a tail cap 203. Shock absorbing material 202 is configured to absorb a primary impact force imparted between it and bottom surface 102BC of can 102 of the terminal battery while the tail cap resilient contact is configured to absorb a secondary impact force imparted between it and the flat contact of the terminal battery, wherein the secondary impact force is substantially less than the primary impact force. While tail cap resilient contact 201 might be configured similarly to resilient contact 22, it may also be configured as a small compression spring, which may be more suitable for use in a replacement kit in which all of the components of the flashlight have not been designed so as to take advantage of use of one or more shock absorbing spacer assemblies and a terminal end shock absorber. Shock absorbing material 202 may be similar or identical to that used in shock absorbing spacer 2.

Figure 41:
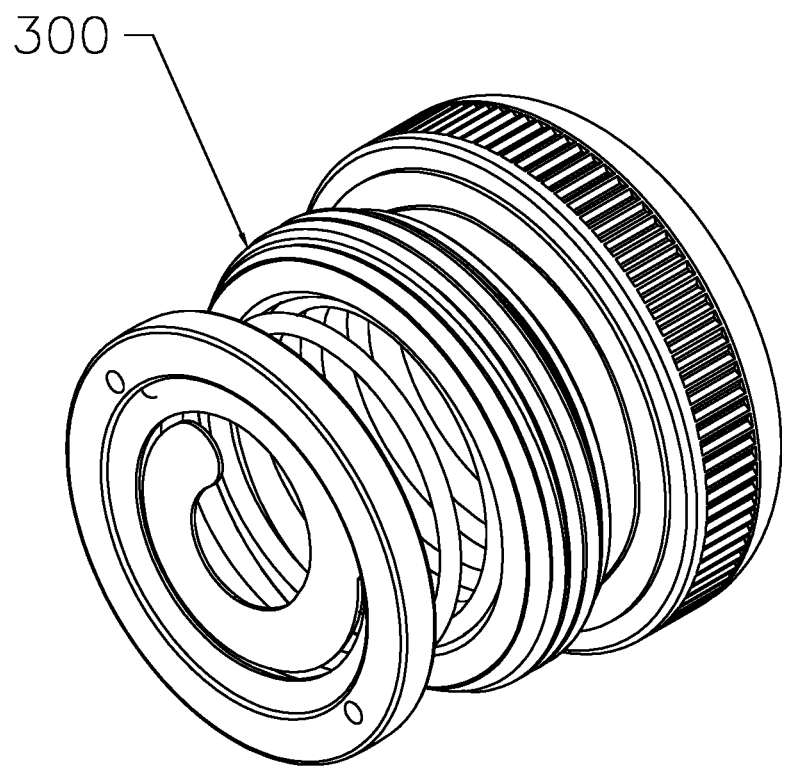
Figure 42:
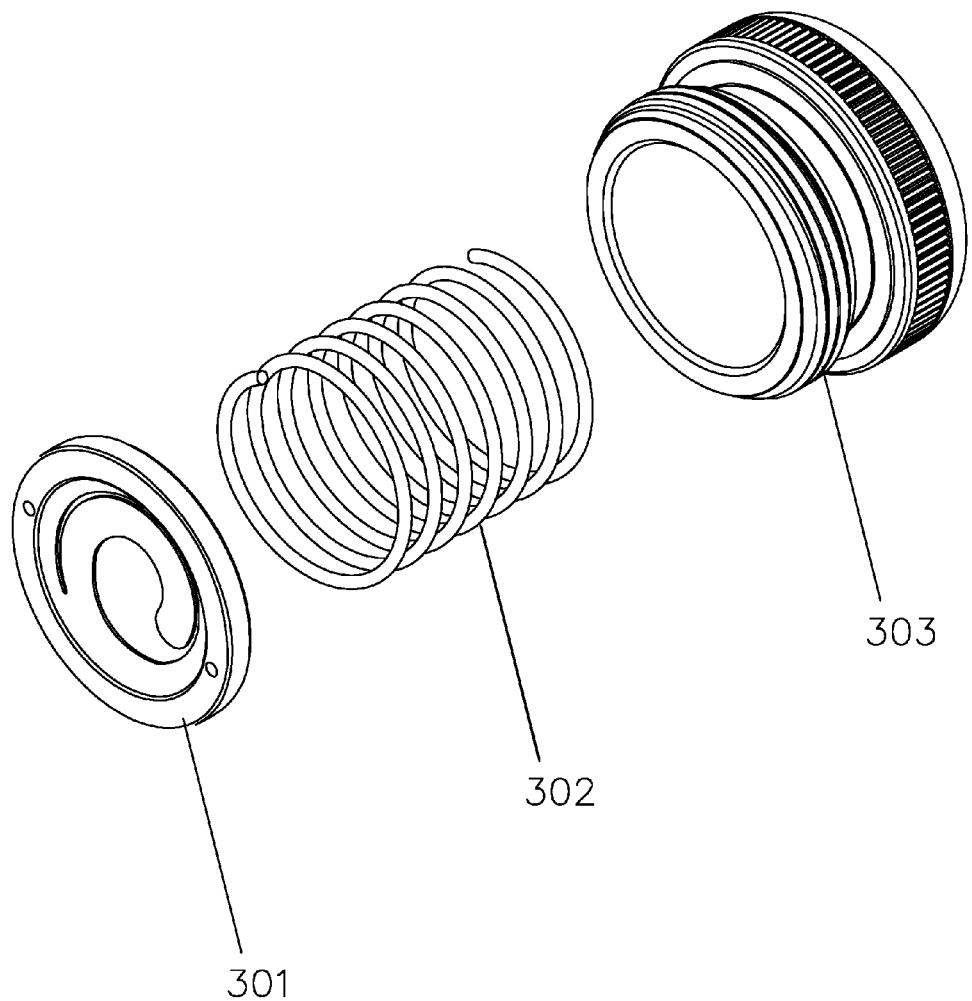
FIG. 42 is an exploded view of FIG. 41.

An alternative embodiment to that shown in FIGS. 39 and 40 is to utilize a shock absorbing spacer 2, as already disclosed, which is modified as illustrated in FIGS. 41 and 42. In this embodiment, the contacts with the terminal end of the terminal battery (or the terminal end of a rechargeable battery pack) of modified spacer 301 remain the same as already described, but the other contacts are replaced with a spring 302 which makes electrical contact with tail cap 303.

While the invention has been described herein with reference to certain preferred embodiments, those embodiments have been presented by way of example only, and not to limit the scope of the invention. Additional embodiments will be obvious to those skilled in the art having the benefit of this detailed description. For example, because the terminal end shock absorber does not need to separate two terminals of batteries in series, but a terminal end of a terminal battery from a tail cap, the terminal end shock absorber might be constructed to provide shock absorption through mechanical means, or means other than using a shock absorbing material similar to that of shock absorbing spacer 2; thus, for example, a tail cap might be designed to include one or more mechanical pistons that compress air within one or more enclosed spaces with appropriate pressure relief.

Accordingly, still further changes and modifications in the actual concepts descried herein can readily be made without departing from the spirit and scope of the disclosed inventions as defined by the following claims.

What is claimed is:

1. A device powered by a plurality of batteries held in a series configuration in a battery compartment, wherein each of the plurality of batteries is comprised of a metal can which holds a cathode, an anode and a current collector, said can having a first end with a first contact having a first polarity and a second end with a second contact having a second polarity, said two or more batteries having a terminal battery in which its second end is a terminal end of the series configuration which is held proximate to a terminal retaining member of the battery compartment, comprising:

for each pair of batteries of the plurality of batteries held in the series configuration, a spacer positioned between the first end of a second battery and the second end of a first battery of the plurality of batteries, wherein the spacer has a thickness sufficient to prevent the first end of the second battery from contacting the second end of the first battery; and for each spacer, a resilient contact which provides a resilient electrical contact between the first end of the second battery and the second end of the first battery;

wherein each spacer is made of a shock absorbing material and is comprised of:

a first resilient contact orientated toward the first end of the second cylindrical battery; and a second resilient contact orientated toward the second end of the first cylindrical battery;

wherein the first and second resilient contacts are held by the shock absorbing material; and wherein the first resilient contact is comprised of a first plurality of resilient ears and the second resilient contact is comprised of a second plurality of resilient ears.

2. The device of claim 1, wherein the button contact of the first end is comprised of a circular plate having a central outer circular wall on top of which is a planar circular contact surface, said central outer circular wall and said planar circular contact surface being electrically conductive and having the first polarity.

3. The device of claim 2, wherein the first plurality of resilient ears contact the circular plate but not the planar circular contact surface.

4. A method for minimizing battery corrosive electrolyte leaks in a flashlight powered by a plurality of batteries held in a series configuration in the barrel of the flashlight, wherein each of the plurality of batteries is comprised of a metal can which holds a cathode, an anode and a current collector, said can having a first end with a button contact having a first polarity and a second end with a substantially flat contact having a second polarity, said plurality of batteries having a terminal battery in which its second end is a terminal end of the series configuration which is held proximate to a tail cap that screws into a tail cap end of the barrel, comprising the steps of:

for each pair of batteries held in series in the flashlight barrel, placing a spacer between said each pair of batteries so that there the same number of spacers as the plurality of batteries less one, wherein each spacer has a thickness sufficient to prevent the first end of the second battery from contacting the second end of the first battery and each spacer has a resilient contact which provides a resilient electrical contact between the first end of the second battery and the second end of the first battery.

\* \* \* \* \*